United States Patent Office 3,635,953
Patented Jan. 18, 1972

3,635,953
2-AMIDOPENICILLINS AND METHODS FOR THEIR PREPARATION
Milton Wolf, West Chester, and John H. Sellstedt, King of Prussia, Pa., assignors to American Home Products Corporation, New York, N.Y.
No Drawing. Continuation-in-part of application Ser. No. 760,090, Sept. 17, 1968. This application July 22, 1969, Ser. No. 843,841
Int. Cl. C07d 99/16, 99/24
U.S. Cl. 260—239.1  12 Claims

ABSTRACT OF THE DISCLOSURE

This invention concerns 2-amidopenicillins and 2-amidocephalosporins having potent antibiotic activity per se, and following hydrolysis to their corresponding acid forms. These 2-amido compounds are prepared by the amidation of penicillin or cephalosporin precursors. Alternatively, 2-amido-6-aminopenicillanic acids and 2- amido-7-aminocephalosporanic acids may be acylated to afford these compounds.

This is a continuation-in-part application of United States patent application, Ser. No. 760,090, entitled "Amido Derivatives of Penicillins and Methods of Preparation," filed on Sept. 17, 1968 by Milton Wolf and John H. Sellstedt.

This invention relates generally to synthetic organic chemicals and more particularly to new 2-amido derivatives of penicillins and cephalosporins having potent antibiotic activity per se, and following transformtion thereof to their corresponding acid forms. Further it concerns methods of preparing these 2-amidopenicillins and 2-amidocephalosporins.

The new and novel synthetic 2-amidopenicillins and 2-amidocephalosporins within the purview of the present invention, include those antibiotically active compounds selected from the group consisting of 2-amidopenicillins, 2-amidocephalosporins and the pharmacologically acceptable, acid-addition salts thereof wherein said amido group is represented by the formula:

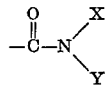

wherein X and Y when taken separately are both electron withdrawing groups; and when X and Y are taken together with the nitrogen atom to which they are attached complete a cyclic electron withdrawing group.

As will be known to those skilled in the penicillin art, included in the 2-amidopenicillins, the 2-amidocephalosporins and the pharmacologically acceptable, acid-addition salts thereof are, for example, those compounds encompassed by the following formulae:

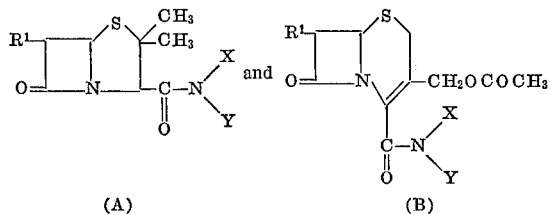

(A) and (B)

and the acid-addition salts thereof;

wherein $R^1$ is a penicillin or cephalosporin amide group e.g. one selected from the group having the following formulae:

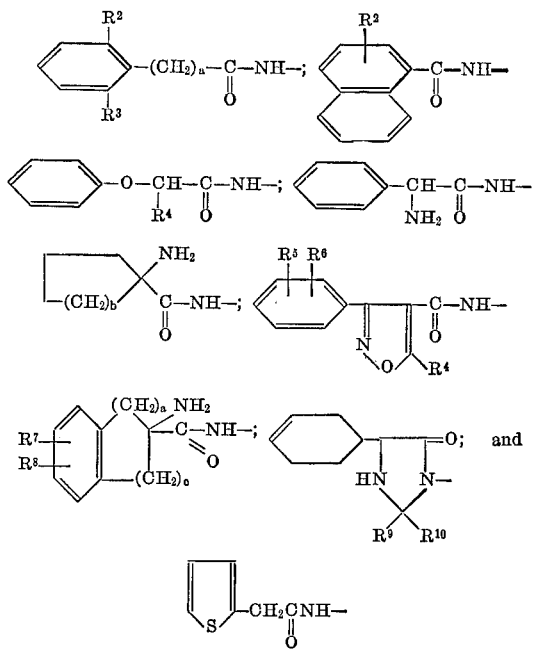

wherein $R^2$ and $R^3$ are selected from the group consisting of hydrogen and lower alkoxy; $R^4$ is selected from the group consisting of hydrogen, lower alkyl and phenyl; $R^5$ and $R^6$ are selected from the group consisting of hydrogen and halogen; $R^7$ and $R^8$ are selected from the group consisting of hydrogen, halogen, lower alkyl, lower alkoxy, phenyl and phenoxy; $R^9$ and $R^{10}$ when taken separately are selected from the group consisting of hydrogen and lower alkyl, and when taken together with the carbon atom to which they are attached complete a ring selected from the group consisting of cycloalkyl containing from about 4 to about 8 carbon atoms and piperidine; $a$ is an integer from 0 to 1; $b$ is an integer from 0 to 5; $c$ is an integer from 1 to 3, with the provisos that when $a$ is 0, $c$ is greater than 1, and when $a$ is 1, $c$ is less than 3; and X and Y are defined as set forth above.

As known to those skilled in the art and to be included in the compounds of this invention are those compounds of Formula B wherein the 3-position "acetoxymethyl" group is modified by known chemical procedures to afford compounds which are substituted at the 3-position with other substituents, for example, methyl, hydroxymethyl or other alkanoyloxymethyl groups.

As known to those skilled in the chemical art, included in those groups which are electron withdrawing when X and Y are taken separately are, for example: cyano; nitro, trifluoromethylsulfonyl; 2,4,6-trimethylbenzoyl, 2,3,5,6-tetramethylbenzoyl; carb(lower)alkoxy; di(lower)alkylcarbamyl; lower alkylsulfonyl; di(lower)alkylsulfamyl; di(lower)alkylamino(lower)alkylsulfony; lower alkanoyl e.g., tert.-butyryl; cyclo(lower)alkanoyl, aroyl e.g. naphthoyl and furoyl; substituted aroyl; arylsulfonyl e.g.

naphthylsulfonyl, pyridylsulfony, furylsulfonyl; substituted arylsulfonyl;

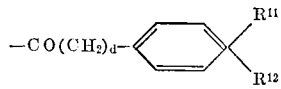

and

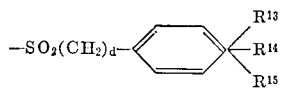

wherein $R^{11}$ and $R^{12}$ are, for example, hydrogen, lower alkyl, halogen, trifluoromethyl, lower alkoxy, phenyl, phenoxy, nitro, lower alkylsulfonyl, di(lower)alkylsulfamyl; $R^{13}$, $R^{14}$ and $R^{15}$ can be hydrogen, nitro, halogen, trifluoromethyl, lower alkyl, lower alkoxy, lower alkylsulfonyl, lower alkylthio, di(lower)alkylsulfamyl, di(lower)alkylcarbamyl, cyano and carb(lower)alkoxy; and the integer $d$ is from 0 to about 6.

As is also known to those skilled in the chemical art, included in those cyclic electron withdrawing groups when X and Y are taken together are, for example:

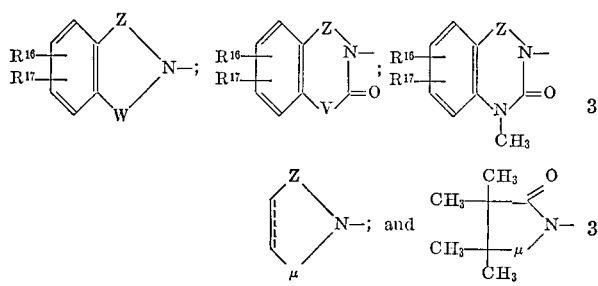

wherein $R^{16}$ and $R^{17}$ when taken separately can be hydrogen; lower alkyl; lower alkoxy; halogen, phenyl; phen(lower)alkyl; lower alkoxyphenyl; 2-pyridyl, 4-pyridyl, trifluoromethyl nitro; di(lower)alkylamino; sulfamido; carb(lower) alkoxy; cyano; lower alkylthio; lower alkylsulfonyl, and when $R^{16}$ and $R^{17}$ are joined, they complete a benzene ring fused to the existing benzene ring to form therewith a naphthalene ring; Z is selected from the group consisting of sulfonyl and carbonyl; W is selected from the group consisting of sulfonyl, carbonyl and methylene; V is selected from the group consisting of oxygen, sulfur and methylene; $\mu$ is selected from the group consisting of carbonyl and methylene; and the broken line indicates the presence of a single or double bond between these two positions.

The preferred embodiments of the compounds of this invention are those compounds of Formula A wherein X and Y are concatenated to form a saccharyl or substituted saccharyl group. These compounds are designated by the following formula:

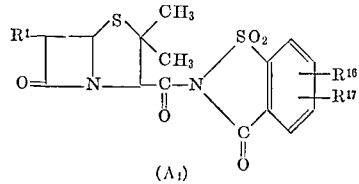

and the acid-addition salts thereof; wherein $R^1$, $R^{16}$ and $R^{17}$ are defined as above.

The term "lower alkyl" as conventionally used herein, alone or in conjunction with the other designated groups, is intended to encompass straight chain or branched chain alkyl groups containing from one to about six carbon atoms, e.g. methyl, ethyl, propyl, isopropyl, butyl, isobutyl, pentyl, 2-ethylpropyl, hexyl, 2-propylpropyl, and the like. Similarly, the terms "lower alkoxy" and "lower alkanoyl" as used herein, alone or in conjunction with other designated groups, are intended to encompass straight chain or branched chain groups also containing from one to about six carbon atoms. The term "halogen" as used conventionally herein, alone or attached to other designated groups, is intended to encompass chlorine, bromine, iodine and fluorine. As will also be understood, the ringed substituents, whether carbocylic e.g. phenyl, benzyl etc. or heterocyclic e.g. 2-pyridyl, 4-pyridyl, and the like may also be substituted by one or more of such usual substituents as those set forth for $R^{16}$ and $R^{17}$ above. Similarly, the naphthalene ring resulting when $R^{16}$ and $R^{17}$ are joined as referred to above, may also carry one or more of the same substituents also referred to above. By the phrase "electron withdrawing group" is meant an electrophilic group which will inductively withdraw electrons from the carbonyl portion of the 2-amido groups of the compounds of this invention thereby making these groups more liable to cleavage by a nucleophilic agent e.g. water, alkali metal hydroxides, tertiary amines, quinoline and the like, to afford a carboxylic acid group.

The novel 2-amidopenicillins and 2-amidocephalosporins of this invention may be prepared generally by reacting a starting penicillin or cephalosporin e.g. a 6-acylated penicillanic acid or a 7-acylated cephalosporanic acid with a suitable reactive nitrogen compound which will replace the hydroxy moiety of the carboxyl group of the penicillin or cephalosporin with a group of the formula:

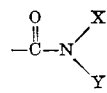

wherein X and Y have the same meaning as hereinbefore defined. Such reactions are well known to those skilled in the art and several thereof are hereinafter schematically illustrated for the preparation of the 2-amidopenicillins of this invention. It should be noted that the new and novel 2-amidocephalosporins of this invention may also be prepared by these reactions merely by replacing the starting penicillin with an appropriate cephalosporin.

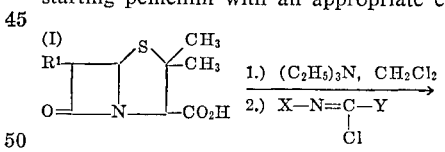

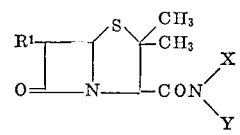

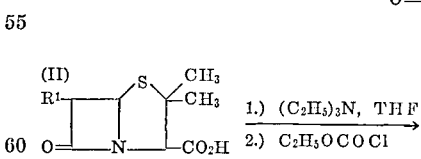

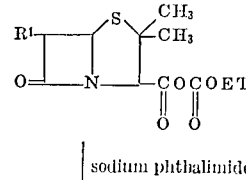

↓ sodium phthalimide

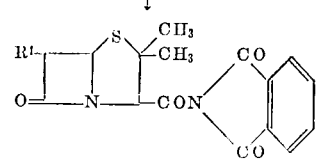

(III)

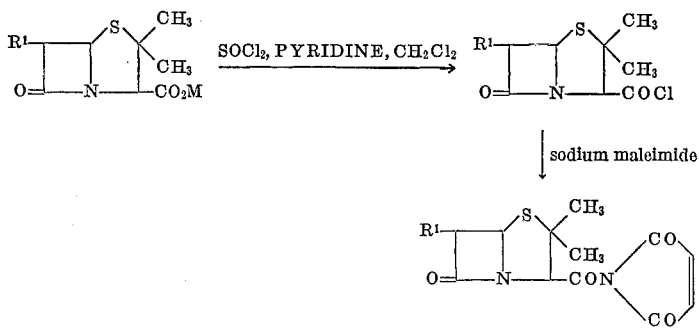

(IV)

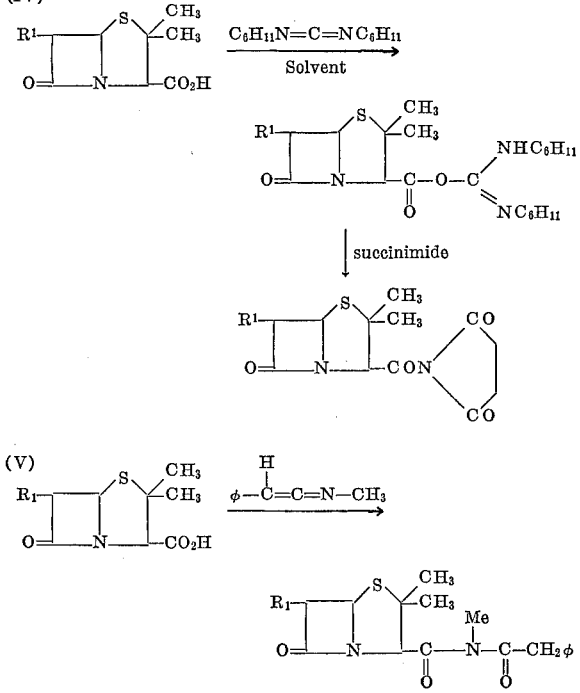

(V)

ployed for providing the aforesaid amido groups are also obtainable commercially or, in those instances where they are not available, they may be synthesized readily by standard organic procedures described in the chemical literature and known to those skilled in the art.

There is also available an alternative method for preparing the new and novel 2-amindopenicillins and 2-amidocephalosporins of the present invention. This new and novel alternative method is especially useful for preparing the new compounds of this invention which are derivatives of synthetic α-amino and 1-amino penicillins and cephalosporins, which contain an additional reactive group to which the haloimine derivatives of other reactants might also attach. In this method, the 2-amido moiety is already present on the 6-aminopenicillanic acid starting material, which is then acylated in the 6-position in the usual manner. Generally, this method comprises first preparing a 2-amido derivative of a penicillin e.g. benzyl penicillin, phenoxy penicillin, penicillin K, and the like. This is accomplished by admixing a particular starting penicillin with a suitable organic solvent e.g. methylene chloride followed by addition of an acid acceptor, such as, triethylamine, trimethylamine and the like to form a solution. Thereafter, this solution is admixed, preferably in the cold, with an appropriate imino halide derivative. When the amidation is complete, the solution is washed, dried and concentrated under vacuum to afford a residue of the 2-amido derivative of the starting penicillin which may then be crystallized from a suitable organic solvent system e.g. ether in benzene. Thereafter, the 2-amido derivative of the penicillin either as the residue or in the crystallized form is dissolved in methylene chloride containing an organic base e.g. N,N-dimethylaniline, quinoline, N-ethylmorpholine and the like and then reacted with a phosphorus pentahalide, such as, phosphorus pentachloride or phosphorus pentabromide to afford the corresponding 6-haloimide. Alternatively, the organic base is preferably added directly to the original reaction mixture after the addition to the imino halide derivative thereby circumventing the above-described isolation and crystallization procedure. This 2-amido-6-haloimido derivative of the penicillin is then admixed with a lower alkanol e.g. methyl alcohol, ethyl alcohol, propyl alcohol, butyl alcohol, and the like to form a hydrohalide acid-addition salt of the 6-alkoxyimido-2-amido derivative of the penicillin wherein the halogen atom of the 6-imido moiety has been replaced by the alkoxy portion of the lower alkanol employed. Thereafter, the reaction mixture is subjected to aqueous hydrolysis to afford the corresponding 2-amido-6-aminopenicillanic acid as the hydrohalide salt. The basic form of this salt is obtained by treating the hydrohalide for a short time with the acid acceptor, such as, triethylamine, sodium bicarbonate and the like, in a solvent, preferably water.

Acylation of this 2-amido-6-aminopenicillanic acid may then be undertaken by conventional procedures, as referred to hereinbefore, to afford the antibiotically active 2-amidopenicillins of the present invention. In those in- Thus, for example, the preferred compounds $(A_1)$ of this invention may be prepared generally by reacting, preferably in the cold, a 3-halosaccharin derivative e.g. 3-chloro-1,2-benzisothiazole 1,1-dioxide or an appropriately substituted derivative thereof, with a penicillin in an organic solvent, such as, anhydrous methylene chloride which contains an acid acceptor e.g. triethylamine. Thereafter, the solution may be washed, dried and concentrated under vacuum at above ambient temperatures. The residue may then be redissolved and crystallized from a suitable organic solvent system e.g. 25% ether in benzene.

The 3-chloro-1,2-benzisothiazole 1,1-dioxide starting material is commercially available, while the $R^{16}$ and $R^{17}$ substituents on the benzo moiety of the saccharin derivatives may be introduced by well known conventional procedures. The penicillins and cephalosporins are either obtainable commercially or may be prepared by procedures well known in the literature. Merely by way of example, there may be noted: U.S. Pat. No. 2,996,501 issued Aug. 15, 1961, to Doyle et al., entitled "Synthetic Penicillins"; U.S. Pat. No. 3,157,639 issued Nov. 17, 1964, to Doyle et al., entitled "Synthetic Penicillins"; U.S. Pat. No. 3,159,617 issued Dec. 1, 1964, to John C. Sheehan, entitled "Production of Penicillins" and U.S. Pat. No. 3,239,507 issued Mar. 8, 1966, to Nayler et al., entitled "Isoxazolylpenicillin Derivatives" which describe conventional methods for preparing the various penicillins employed as starting materials. Similarly, the reactive nitrogen compounds emstances where it is deemed desirable to obtain the acid forms of the penicillins per se; i.e., without the 2-amido substituent, said acid forms may be obtained by simple hydrolysis. For example, the 2-amidopenicillin upon treatment for a sufficient length of time with water or a mixture of water and a miscible organic solvent, for example, at a pH of from about 1.5 to about 9 affords the deamidated penicillin. It should be noted that, although the above-described process has been described in terms of 2-amidopenicillins, it is equally applicable to the 2-amidocephalosporins of this invention.

The antibiotically active 2-amidopenicillins and 2-amidocephalosporins of the present invention possess valuable biological activity. In particular, in standard and accepted biological tests these compounds exhibit activity against gram-positive and gram-negative bacterial. In this regard, these compounds are, therefore, of value as antibacterial agents, nutritional supplements in animal feeds; agents for the treatment of mastitis in cattle; and as therapeutical agents in poultry and animals, in the treatment of infectious diseases caused by gram-positive and gram-negative bacteria, upon either parenteral or oral administration. Further, upon the parenteral administration e.g. intramuscular of the compounds of this invention a sustained antibacterial activity is effected by the slow in situ hydrolysis thereof to afford the corresponding deamidated penicillins which are then readily absorbed.

As will be understood by those skilled in the art, the 2-amidopenicillins and 2-amidocephalosporins of this invention may be utilized as such, or in the cases of those compounds of the α-amino or 1-amino type, they may be in the form of the pharmacologically acceptable, acid-addition salts thereof prepared by the reaction of the selected antibiotically active compound with a suitable organic or inorganic acid e.g. hydrochloric, hydrobromic, fumaric, citric, and the like, as is conventional in this art.

As will also be understood by those skilled in the art, the antibiotically active 2-amidopenicillins and 2-amidocephalosporins of this invention may be utilized in pharmacological compositions in association with phramacologically acceptable carriers, e.g. in suitable injectable form, including solutions and suspenions; or orally as tablets, capsules, and the like, utilizing conventional solvents, suspensoids, excipients, and the like. As previously indicated, when the compounds of this invention are employed, they may be administered orally or parenterally. Naturally, the dosage of these compounds will vary somewhat with the form of administration and the particular compound chosen. Further, it will vary with the particular subject under treatment. In general, the compounds of this invention are most desirably administered at dosage levels corresponding to those of commercially available penicillins and cephalosporins. Although variations from these dosages will occur, these dosages will generally afford effective results without causing any harmful or deleterious side effects.

The following examples are given by way of illustrating some embodiments of this invention.

EXAMPLE I

Saccharimide of phenoxymethyl penicillin 3,3 - dimethyl - 7 - oxo - 6 - (2 - phenoxyacetamido)-4-thia-1-azabicyclo[3.2.0]heptane-2-carboxylic acid, also known as phenoxymethyl penicillin (17.5 g., 0.05 mole), is added to anhydrous methylene chloride (750 ml.) followed by triethylamine (5.05 g., 0.05 mole), givin a solution. The magnetically stirred solution is cooled to 3° C. in ice-water and then admixed with 3-chloro-1,2-benzisothiazole 1,1-dioxide (10.05 g., 0.05 mole) all at once, giving a light yellow solution. After stirring for one-half hour in ice-water, the solution is kept overnight at room temperature. The solution is then washed with cold water (700 ml.), cold 0.13 M, pH 7.4 ($K_2HOP_4/KH_2PO_4$) (500 ml.), and dried with sodium sulfate. The filtrate is dried over calcium sulfate, and then concentrated at 40° C. under vacuum, giving a foam (24.2 g.). The foam is dissolved in 25% ether in benzene (approx. 80 ml.), giving crystals of 2 - [(3,3 - dimethyl-7-oxo-6-[2-phenoxyactamido] - 4 - thia - 1 - azabicyclo[3.2.0]hept-2-yl) carbonyl] - 1,2 - benzisothiazol - 3 (2$\underline{H}$) - one - 1,1-dioxide, also designated as the saccharimide of phenoxymethyl penicillin (18.6 g., 70%), M.P. 171 C. dec. (uncorr.).

*Analysis.*—Calcd. for $C_{23}H_{21}N_3O_7S_2O \cdot 7H_2O$ (percent): C, 52.30; H, 4.27; N, 7.96; S, 12.14; $H_2O$, 2.38. Found (percent): C, 52.22; H, 3.91; N, 7.89; S, 12.18; $H_2O$, 2.35.

EXAMPLE II

Saccharimide of 6-(2,2-dimethyl-5-oxo-4-phenyl-imidazolidin-1-yl)penicillanic acid 6 - (2,2 - dimethyl - 5 -oxo - 4 - phenylimidazolidin-1-yl) - 3,3 - dimethyl - 7 - oxo - 4 - thia - 1 - azabicyclo [3.2.0]heptane-2-carboxylic acid, also known as 6-(2,2-dimethyl - 5 - oxo - 4 - phenylimidazolidin - 1 - yl)penicillanic acid (3.90 g., 0.01 mole), is added to anhydrous methylene chloride (150 ml.) followed by triethylamine (1.01 g., 0.01 mole), giving a solution. The magnetically stirred solution is cooled to 3° C. in ice-water and 3-chloro-1,2-benzisothiazole 1,1-dioxide (2.02 g., 0.01 mole) is added all at once. The resulting solution is reacted and worked-up in a manner similar to Example I, giving a light yellow solid which is 2-[(6-[2,2-dimethyl-5-oxo-4-phenylimidazolidin-1-yl] - 3,3 - dimethyl - 7 - oxo - 4-thia-1-azabicyclo[3.2.0]hept - 2 - yl)carbonyl] - 1,2 - benzisothiazol - 3(2$\underline{H}$ - one 1,1-dioxide, also designated as the saccharimide of 6-(2,2-dimethyl-5-oxo-4-phenylimidazolidin-1-yl)penicillanic acid (3.7 g., 67%), M.P. 182° C. dec. (uncorr.).

*Analysis.*—Calcd. $C_{26}H_{26}N_4O_6S_2$ (percent): C, 56.30; H, 4.72; N, 10.10; S, 11.57. Found (percent): C, 56.08; H, 4.52; N, 10.21; S, 11.78.

EXAMPLE IV

Saccharimide of 2-ethoxynaphthyl penicillin 6-(2-ethoxy-1-naphthamido) - 3,3 - dimethyl-7-oxo-4-thia-1-azabicyclo[3.2.0]heptane-2-carboxylic acid (20.7 g., 0.050 mole), also known as 2-ethoxynaphthyl penicillin, is added to methylene chloride (750 ml.) followed by triethylamine (5.05 g., 0.050 mole) 3-chloro-1,2-benzisothiazole 1,1-dioxide (10.1 g., 0.050 mole) is added to the cooled solution (about 3° C.) in a single portion with stirring, and the reaction mixture processed in a manner similar to that of Example I. The product is obtained as a foam which is converted to a gummy solid on heating with absolute ethanol (about 300 ml.) and cooling and scratching. The crude product is recrystallized from ethyl acetate-hexane (charcoal), giving white crystals of 2-[(6-[2-ethoxy - 1 - naphthamido]-3,3-dimethyl-7-oxo-4-thia-1-azabicyclo[3.2.0]hept - 2 - yl)carbonyl]-1,2-benzisothiazolin-3-one 1,1-dioxide, also designated as the saccharimide of 2-ethoxynaphthyl penicillin, (1.5 g.) M.P. 180° C. dec. (uncorr.).

*Analysis.*—Calcd. for $C_{28}H_{25}N_3O_7S_2$ (percent): C, 58.02; H, 4.34 ; N, 7.25; S, 11.07. Found (percent): C, 58.17; H, 4.51; N, 7.50; S. 10.90.

EXAMPLE V

Following the procedures described in Examples I–IV a series of penicillins are reacted with various saccharin chloride derivatives to obtain the corresponding saccharimides of penicillins having potent antibiotic activity. The reactants and resulting saccharimides of penicillins are set forth in Table A:

TABLE A

| Penicillins | Saccharin chloride derivatives | Saccharimides of penicillins |
| --- | --- | --- |
| Phenoxymethyl penicillin | 3-chloro-5-ethyl-1,2-benzisothiazole 1,1-dioxide | 5-ethylsaccharimide of phenoxymethyl penicillin |
| 6-(2,2-dimethyl-5-oxo-4-phenylimidazolidin-1-yl) penicillanic acid | 3,5-dichloro-6-propyl-1,2-benzisothiazole 1,1-dioxide | 6-propyl-5-chlorosaccharimide of 6-(2,2-dimethyl-5-oxo-4-phenylimidazolidin-1-yl) penicillanic acid |
| 2-ethoxy naphthyl penicillin | 3-chloro-5-nitro-1,2-benzisothiazole 1,1-dioxide | 5-nitrosaccharimide of 2-ethoxynaphthyl penicillin |
| Phenoxyprop-1-yl penicillin | 4,5-dibromo-3-chloro-1,2-benzisothiazole 1,1-dioxide | 4,5-dibromosaccharimide of phenoxyprop-1-yl penicillin |
| 3-(2,6-dichlorophenyl)-5-methyl-4-isoxazoyl penicillin | 3-chloro-5-hexyl-1,2-benzisothiazole 1,1-dioxide | 5-hexylsaccharimide of 3-(2,6-dichlorophenyl)-5-methyl-4-isoxazoyl penicillin |
| 3-phenyl-5-methyl-4-isoxazoyl penicillin | 6-butoxy-3-chloro-5-phenyl-1,2-benzisothiazole 1,1-dioxide | 6-butoxy-5-phenylsaccharimide of 3-phenyl-5-methyl-4-isoxazoyl penicillin |
| 3-(p-chlorophenyl)-5-methyl-4-isoxazoyl penicillin | 3-chloro-5-(p-methoxyphenyl)-1,2-benzisothiazole 1,1-dioxide | 5-(p-methoxyphenyl)-saccharimide of 3-(p-chlorophenyl)-5-methyl-4-isoxazoyl penicillin |
| Benzyl penicillin | 3-chloro-6-phenyl-1,2-benzisothiazole 1,1-dioxide | 6-phenylsaccharimide of benzyl penicillin |
| Phenoxyethyl penicillin | 5-benzyl-3-chloro-1,2-benzisothiazole 1,1-dioxide | 5-benzylsaccharimide of phenoxyethyl penicillin |
| 2-methoxy naphthyl penicillin | 3-chloro-7-(m-propoxyphenyl)-1,2-benzisothiazole 1,1-dioxide | 7-(m-propoxyphenyl)-saccharimide of 2-methoxy-naphthyl penicillin |
| 3-(o-chlorophenyl)-5-methyl-4-isoxazoyl penicillin | 6-butyl-3-chloro-5-fluoro-1,2-benzisothiazole 1,1-dioxide | 6-butyl-5-fluorosaccharimide of 3-(o-chlorophenyl)-5-methyl-4-isoxazoyl penicillin |
| 3,5-diphenyl-4-isoxazoyl penicillin | 3-chloro-5,6-dimethyl-1,2-benzisothiazole 1,1-dioxide | 5,6-dimethylsaccharimide of 3,5-diphenyl-4-isoxazoyl penicillin |
| α-Phenoxybenzyl penicillin | 3-chloro-4-(2-pyridyl)-1,2-benzisothiazole 1,1-dioxide | 4-(2-pyridyl)-saccharimide of α-phenoxybenzyl penicillin |
| α-Phenoxyethyl penicillin | 3-chloro-5-dimethylamino-1,2-benzisothiazole 1,1-dioxide | 5-dimethylaminosaccharimide of α-phenoxyethyl penicillin |
| 2,6-dimethoxy benzyl penicillin | 3-chloro-6-trifluoromethyl-1,2-benzisothiazole 1,1-dioxide | 6-trifluoromethylsaccharimide of 2,6-dimethoxy-benzyl penicillin |

EXAMPLE VI

Saccharimide of ampicillin

2-[(6-amino-3,3-dimethyl-7-oxo-4-thia-1-azabicyclo-[3.2.0]hept-2-yl)carbonyl]-1,2-benzisothiazol-3(2H)-one 1,1-dioxide, p-toluenesulfonic acid salt, also known as the saccharimide of 6-aminopenicillanic acid, p-toluenesulfonic acid salt, (5.5 g., 0.01 mole) is dissolved in 80% acetone water (230 ml.) at 0° C., to afford a solution having a pH of 2.2. Then D-(−)-α-aminophenylacetyl chloride hydrochloride (3.1 g., 0.015 mole) is added to the magnetically stirred solution in about ten portions over one-half hour at 0° C., keeping the pH at 2–3 with 50% sodium hydroxide. The solution is stirred an additional fifteen minutes at 0° C. and the pH is adjusted to 4.5 with 50% sodium hydroxide. Then the acetone is removed at 0° C. under vacuum and the volume of the residual water is adjusted to 100 ml. The pH is adjusted to 0° C. to 6.8 with 50% sodium hydroxide, giving 2-[(6-D-[2-amino-2-phenylacetamido]-3,3-dimethyl-7-oxo-4-thia-1-azabicyclo[3.2.0]hept-2-yl)carbonyl]1,2-benzisothiazol-3(2H)one 1,1-dioxide also designated as the saccharimide of ampicillin, as a light yellow solid (3.2 g., 62%), M.P. 170° C. dec. (uncorr.).

EXAMPLE VII

Saccharimide of 1-aminocyclohexane penicillin

2-[(6-amino-3,3-dimethyl-7-oxo-4-thia-1-azabicyclo-[3.2.0]hept-2-yl)carbonyl]-1,2-benzisothiazol-3(2H)-one, 1,1-dioxide (1.91 g., 0.005 mole) is dissolved in methylene chloride (100 ml.) and the stirred solution is cooled at −5° C. in an ice-salt bath. Pyridine (0.403 ml., 0.005 mole) is added, followed by 1-aminocyclohexane carboxylic acid chloride, hydrochloride (1.02 g., 0.005 mole), and the mixture is stirred at −5° C. for twenty minutes. The resulting solution is allowed to warm to room temperature, and then stirred for two hours, giving a white solid precipitate. The mixture is divided in half and one-half is filtered and washed with methylene chloride, giving 2-[(6-(1-aminocyclohexanecarboxamido)-3,3-dimethyl-7-oxo-4-thia-1-azabicyclo[3.2.0]hept-2-yl) carbonyl]-1,2-benzisothiazol-3(2H)-one 1,1-dioxide hydrochloride, also designated as the saccharimide of 1-aminocyclohexane penicillin, hydrochloride, as a white solid (1.15 g., 85% based on one-half the total yield), M.P. 153° C. dec. (uncorr.).

Analysis.—Calcd. for $C_{22}H_{26}N_4O_6S_2 \cdot HCl$ (percent): C, 48.65; H, 5.01; N, 10.32; S, 11.81; Cl, 5.01. Found (percent): C, 48.71; H, 5.12; N, 10.14; S, 10.25; Cl, 9.83.

The other half of the mixture is evaporated to dryness under vacuum at 30° C., giving a white solid (1.7 g.). The solid is powdered and added to water (15 ml.) at 3° C. which is kept constantly at pH 9.4 with 1 N sodium hydroxide. The mixture is filtered ten minutes after the final addition and washed with water, giving 2-[(6-[1-aminocyclohexanecarboxamido]-3,3-dimethyl-7-oxo-4-thia-1-azabicyclo[3.2.0]hept-2-yl)-carbonyl]-1,2-benzisothiazol-3(2H)-one 1,1-dioxide, also described as the saccharimide of 1-aminocyclohexane penicillin, as a white solid (1.25 g., 99% based on one-half of the total yield), M.P. 145° C. dec. (uncorr.).

Analysis.—Calcd. for $C_{22}H_{26}N_4O_6S_2 \cdot H_2O$ (percent): C, 50.37; H, 5.38; N, 10.68; S, 12.23; $H_2O$, 3.44. Found: (percent): C, 49.78; H, 5.54; N, 11.11; S, 12.59; $H_2O$, 3.34.

EXAMPLE VIII

Following the procedures of Examples VI–VII, a series of saccharimides of 6-aminopenicillanic acid (6–APA) are reacted with various acylating agents to obtain the saccharimides of penicillins having potent antibiotic activity. The reactants and resulting saccharimide of penicillins are set forth in Table B below:

TABLE B

| Saccharimides of 6-aminopenicillanic acid (6-APA) | Acylating agents | Saccharimide penicillins |
| --- | --- | --- |
| 5-methyl-4-(4-pyridyl) saccharimide of 6-APA | N-carboxyanhydride of 1-aminocyclopentane carboxylic acid | 5-methyl-4-(4-pyridyl)saccharimide of 1-aminocyclopentane penicillin |
| 5-trifluoromethylsaccharimide of 6-APA | N-carboxyanhydride of 1-aminocyclohexane carboxylic acid | 5-trifluoromethylsaccharimide of 1-aminocyclohexane penicillin |
| 6-dimethylamino-7-methylsaccharimide of 6-APA | Phenylglycine chloride, hydrochloride | 6-dimethylamino-7-methylsaccharimide of 1-aminobenzyl penicillin |
| 6-sulfamidosaccharimide of 6-APA | N-carboxyanhydride of 1-amino-1-indane carboxylic acid | 6-sulfamidosaccharimide of 1-amino-1-indane penicillin |
| 5-carbethoxysaccharimide of 6-APA | N-carboxyanhydride of 1-amino-1,2,3,4-tetrahydronaphthoic acid | 5-carbethoxysaccharimide of 1-amino-1,2,3,4-tetrahydronaphthyl penicillin |
| 5-cyanosaccharimide of 6-APA | N-carboxyanhydride of 1-amino-7-ethoxy-1,2,3,4-tetrahydro-1-naphthoic acid | 5-cyanosaccharimide of 1-amino-7-ethoxy-1,2,3,4-tetrahydro-1-naphthyl penicillin |
| 6-(prop-2-yl)thiosaccharimide of 6-APA | N-carboxyanhydride of 1-amino-4-phenyl-1-indane carboxylic acid | 6-(prop-2-yl)thiosaccharimide of 1-amino-4-phenyl-1-indane penicillin |
| 5-ethylsulfonylsaccharimide of 6-APA | N-carboxyanhydride of 2-amino-3-phenoxy-2-indane carboxylic acid | 5-ethylsulfonylsaccharimide of 2-amino-3-phenoxy-2-indane penicillin |
| 5,6-benzosaccharimide of 6-APA | N-carboxyanhydride of 1-amino-1,2,3,4-tetrahydro-3,6-dimethyl-1-naphthoic acid | 5,6-benzosaccharimide of 1-amino-1,2,3,4-tetrahydro-3,6-dimethyl-1-naphthyl penicillin |

EXAMPLE IX

The dimethylcarbamyl dimethylsulfamyl imide of ampicillin

6 - amino - 3,3 - dimethyl-N-dimethylcarbamyl-N-dimethylsulfamyl-7-oxo - 4 - thia-1-azabicyclo[3.2.0]heptane-2-carboxamide (7.81 g., 0.02 mole) is dissolved in 60% water-tetrahydrofuran (200 ml.) containing N-carboxy-D-phenylglycine anhydride (5.32 g., 0.03 mole) at 0–5° C., and the pH is adjusted to 5 with glacial acetic acid. The solution is stirred for three hours at 0–5° C. and filtered. The tetrahydrofuran is removed at 0° C. under vacuum, and the pH of the aqueous residue is adjusted to approximately 7 at 0° C. The mixture is filtered, giving D-(2-amino - 2 - phenylacetamido)-3,3-dimethyl-N-dimethylcarbamyl-N-dimethylsulfamyl - 7 - oxo-4-thia-1-azabicyclo[3.2.0] heptane-2-carboxamide, also described as the dimethylcarbamyl dimethylsulfamyl imide of ampicillin, as a light yellow solid.

EXAMPLE X

Utilizing the general procedure of Example IX to acylate a series of 2-amido-6-aminopenicillanicacids by reaction with the N-carboxyanhydride of phenylglycine, the corresponding 2-amido derivatives of ampicillin are obtained as indicated in the following table:

Table C

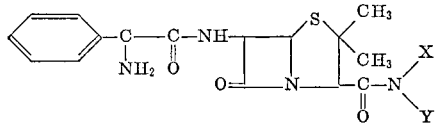

wherein X and Y when taken separately are defined as follows:

| X | Y |
|---|---|
| Cyano | Cyano. |
| Do | Nitro. |
| Do | Trifluoromethylsulfonyl. |
| Do | Carbopentoxy. |
| Do | N,N-dimethylcarbamyl. |
| Do | Ethylsulfonyl. |
| Do | N,N-diethylsulfamyl. |
| Nitro | Trifluoromethylsulfonyl. |
| Do | Carbethoxy. |
| Do | N,N-dipropylcarbamyl. |
| Do | Methylsulfonyl. |
| Do | N-ethyl-N-methylsulfamyl. |
| Trifluoromethylsulfonyl | Trifluoromethylsulfonyl. |
| Do | Carbohexoxy. |
| Do | N-ethyl-N-methylcarbamyl. |
| Do | Propylsulfonyl. |
| Do | N,N-dimethylsulfamyl. |
| Carbomethoxy | N,N-dipentylcarbamyl. |
| Do | Methylsulfonyl. |
| Do | N,N-dimethylsulfamyl. |
| N,N-dimethylcarbamyl | N,N-diethylcarbamyl. |
| Do | Pentylsulfonyl. |
| Do | N,N-dimethylsulfamyl. |
| Do | N,N-dimethylcarbamyl. |
| N,N-dimethylsulfamyl | N,N-dimethylsulfamyl. |
| Cyano | p-Butylbenzoyl. |
| Do | m-Toluyl. |
| Do | p-Phenoxybenzoyl. |
| Methylsulfonyl | o-Chlorobenzoyl. |
| Do | 2,4-dibromobenzoyl. |
| Carbethoxy | p-Chloro-m-toluyl. |
| Do | p-Iodobenzoyl. |
| N,N-dimethylcarbamyl | p-Ethylbenzoyl. |
| Carbobutoxy | p-Methoxybenzoyl. |
| Nitro | p-Phenylbenzoyl, |

EXAMPLE XI

Repeating the procedure of Examples IX–X, to acylate 2-amido-6-aminopenicillanic acid and 2-amido-7- aminocephalosporanic acids by reaction with appropriate N-carboxyanhydrides, the compounds of Tables D, E, F, G and H are obtained:

Table D

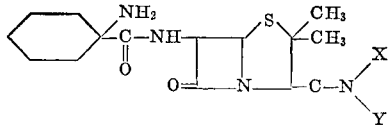

wherein X and Y when taken separately are defined as follows:

| X | Y |
|---|---|
| p-Nitrophenylsulfonyl | m-Nitrobenzoyl. |
| p-Trifluoromethylphenylsulfonyl | p-methylsulfonylbenzoyl. |
| 2,4-dinitrophenylsulfonyl | p-Toluyl. |
| p-Chlorophenylsulfonyl | p-Methoxybenzoyl. |
| Trifluoromethylsulfonyl | p-(N,N-dimethylsulfamyl)benzoyl. |
| m-(N,N-diethylsulfamyl)benzoyl | p-Trifluoromethylbenzoyl. |
| Carbomethoxy | p-Trifluoromethylbenzoyl. |
| Cyano | o-Chlorophenylsulfonyl. |
| Do | m-Trifluoromethylphenylsulfonyl. |
| Trifluoromethylsulfonyl | p-Nitrophenylsulfonyl. |
| N,N-dimethylcarbamyl | 2-bromo-4-chlorophenylsulfonyl. |

Table E

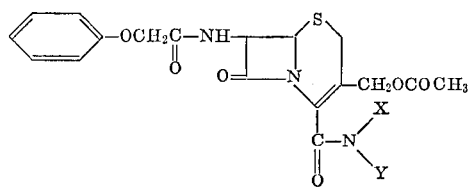

wherein X and Y when taken separately are defined as follows:

| X | Y |
|---|---|
| Methylsulfonyl | 2-bromo-4-nitrophenylsulfonyl. |
| N,N-dimethylsulfamyl | m-(N,N-dimethylcarbamyl)phenylsulfonyl. |
| Carbohexoxy | p-Methylsulfonylphenylsulfonyl. |
| Do | p-(N,N-diethylsulfamyl)phenylsulfonyl. |
| Trifluoromethylsulfonyl | 4-cyano-2-iodophenylsulfonyl |
| Cyano | 2-fluoro-4-nitrophenylsulfonyl |
| Pentylsulfonyl | p-Carbobutoxyphenylsulfonyl. |

Table F

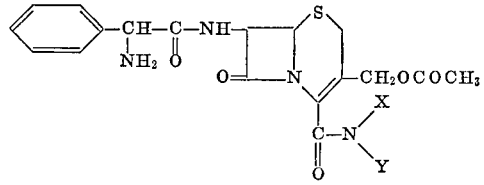

wherein X and Y when taken separately are defined as follows:

| X | Y |
|---|---|
| Propionyl | p-Iodobenzylsulfonyl. |
| Acetyl | Butyryl. |
| Propionyl | Benzoyl. |
| Cyano | Phenylsulfonyl. |
| 2,4,6-trimethylbenzoyl | Phenethylsulfonyl. |
| Do | p-Methoxyphenylsulfonyl. |
| N,N-dimethylcarbamyl | N,N-dimethylaminoethylsulfonyl. |
| 2,3,5,6-tetramethylbenzoyl | p-Methylthiophenylsulfonyl. |
| Cyclovaleryl | m-Nitrophenethylsulfonyl. |

Table G

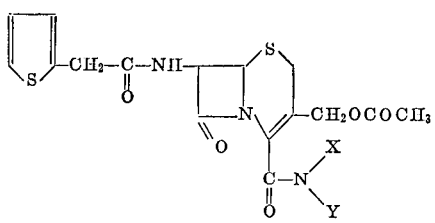

wherein X and Y when taken separately are defined as follows:

| X | Y |
|---|---|
| N,N-dipropylaminobutylsulfonyl | 2-naphthoyl. |
| Cyano | 2,4-dimethylbenzoyl. |
| Cyclobutyryl | p-Fluorophenacetyl. |
| Cyclocaproyl | Trifluoromethylsulfonyl. |
| Furoyl | Cyano. |
| N,N-dimethylsulfamylphenpropionyl | Carbopropoxy. |
| p-Propylphenylsulfonyl | Acetyl. |
| 2-naphthylsulfonyl | p-Butoxybenzoyl. |
| Phenbutyryl | Nitro. |
| 2-furylsulfonyl | Caproyl. |

Table H

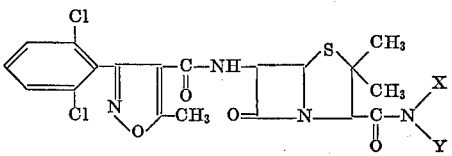

wherein X and Y when taken separately are defined as follows:

| X | Y |
|---|---|
| 2-pyridylsulfonyl | Methylsulfonyl. |
| Phencaproyl | Cyano. |
| Phenpropylsulfonyl | Trifluoromethylsulfonyl. |
| p-Propysulfonylphenylsulfonyl | Cyano. |
| Nitro | p-(N,N-dibutylcarbamyl)phenyl sulfonyl. |
| m-Carbomethoxyphenylsulfonyl | Carbethoxy. |
| p-Propoxyphenylsulfonyl | Methylsulfonyl. |
| Cyano | p-Pentylthiophenylsulfonyl. |

EXAMPLE XII

The maleimide of 1-aminocyclohexane penicillin

1 - [(6 - amino - 3,3 - dimethyl - 7 - oxo - 4 - thia - 1- azabicyclo[3.2.0]hept - 2 - yl)carbonyl] - Δ³,⁴ - pyrroline- 2,5-dione, also known as the maleimide of 6-aminopenicillanic acid (5.90 g., 0.02 mole) is dissolved in 60% water-tetrahydrofuran (200 ml.) containing N-carboxy-1-aminocyclohexane carboxylic anhydride (5.07 g., 0.03 mole) at 0–5° C., and the pH is adjusted to 5 with glacial acetic acid. The solution is stirred for three hours at 0–5° C. and filtered. The tetrahydrofuran is removed at 0° C. under vacuum, and the pH of the aqueous residue is adjusted to approximately 7 at 0° C. The mixture is filtered, giving 2 - [(6 - [1 - aminocyclohexanecarboxamido] - 3,3 - dimethyl - 7 - oxo - 4 - thia - 1 - azabicyclo [3.20]hept - 2 - yl)carbonyl] - Δ³,⁴ - pyrroline - 2,5-dione, also described as the maleimide of 1-aminocyclohexane penicillin as a light yellow solid.

EXAMPLE XIII

Following the general procedure of Example XII, to acylate a series of 2 - cycloamido - 6 - aminopenicillanic acid by reaction with the N-carboxyanhydride of 1-aminocyclohexane carboxylic acid, there is obtained the corresponding 2-cycloamido penicillin derivatives indicated in Table I below.

Table I

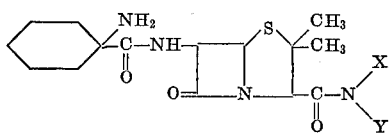

wherein X and Y when taken together with the nitrogen atom to which they are attached form the following cyclic electron withdrawing groups:

3-oxo-1,2-benzisothiazolin-2-yl, 1,1-dioxide;
5-ethyl-3-oxo-1,2-benzisothiazolin-2-yl, 1,1-dioxide;
phthalimido;
4-methoxyphthalimido;
maleimido;
succinimido;
3-oxo-2-isothiazolidinyl, 1,1-dioxide;
3-oxo-4-isothiazolin-2-yl, 1,1-dioxide;
3-oxo-4,1,2-benzoxathiazin-2(3H)-yl, 1,1-dioxide;
6,7-dichloro-3-oxo-4,12-benzoxathiazin-2(3H)-yl, 1,1-dioxide;
3-oxo-1,4,2-benzodithiazin-2(3H)-yl, 1,1-dioxide;
3-oxo-6-nitro-1,4,2-benzodithiazin-2(3H)-yl, 1,1-dioxide;
3,4-dihydro-4-methyl-3-oxo-2H-1,2,4-benzothiadiazin-2-yl, 1,1-dioxide;
6-cyano-3,4-dihydro-4-methyl-3-oxo-2H-1,2,4-benzothiadiazin-2-yl, 1,1-dioxide;
tetramethylsuccinimido;
3,3,4,4-tetramethyl-2-oxo-1-pyrrolidinyl;
3,4-dihydro-2,4-dioxo-2H-1,3-benzoxazin-3-yl;
6-bromo-3,4-dihydro-2,4-dioxo-2H-1,3-benzoxazin-3-yl;
3,4-dihydro-2,4-dioxo-2H-1,3-benzothiazin-3-yl;
7-trifluoromethyl-3,4-dihydro-2,4-dioxo-2H-1,3-benzothiazin-3-yl;
1,4-dihydro-1-methyl-2,4-dioxo-3(2H)quinazolinyl;
7-ethylsulfonyl-1,4-dihydro-1-methyl-2,4-dioxo-3(2H) quinazolinyl;
1,2-benzisothiazolin-2-yl, 1,1-dioxide;
6-fluoro-1,2-benzisothiazolin-2-yl, 1,1-dioxide;
1-oxo-2-isoindolinyl;
5-benzyl-1-oxo-2-isoindolinyl;
2-oxo-3-pyrrolin-1-yl;
2-isothiazolidinyl, 1,1-dioxide;
2-oxo-1-pyrrolidinyl;
4-isothiazolin-2-yl, 1,1-dioxide;
3,4-dihydro-3-oxo-2H-1,2-benzothiazin-2-yl, 1,1-dioxide;
6-chloro-3,4-dihydro-7-methyl-3-oxo-2H-1,2-benzothiazin-2-yl, 1,1-dioxide;
3,4-dihydro-1,3-dioxo-2(1H)-isoquinolyl;
7-carbomethoxy-3,4-dihydro-1,3-dioxo-2(1H)-isoquinolyl;
o-benzenedisulfonimido; and
o-(3-bromobenzene)disulfonimido.

EXAMPLE XIV

Repeating the general procedure of Example XII to acylate a series of 2-cycloamido-7-aminocephalosporins by reaction with N-carboxyanhydride of 1-aminocyclohexane carboxylic acid, there is obtained the corresponding 2-cycloamidocephalosporin derivatives indicated in Table J below:

Table J

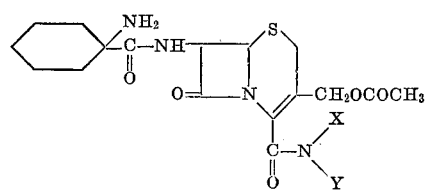

wherein X and Y when taken together with the nitrogen atom to which they are attached form the following cyclic electron withdrawing groups:

5-ethyl-3-oxo-1,2-benzisothiazolin-2-yl, 1,1-dioxide;
phthalimido;
succinimido;
3-oxo-2-isothiazolidinyl, 1,1-dioxide;
3-oxo-4-isothiazolin-2-yl, 1,1-dioxide;
6,7-dichloro-3-oxo-4,1,2-benzoxathiazin-2(3H)-yl, 1,1-dioxide;
3-oxo-1,4,2-benzodithiazin-2(3H)-yl, 1,1-dioxide;
6-cyano-3,4-dihydro-4-methyl-3-oxo-2H-1,2,4-benzothiadiazin-2-yl, 1,1-dioxide;
tetramethylsuccinimido;
3,4-dihydro-2,4-dioxo-2H-1,3-benzoxazin-3-yl;

7-trifluoromethyl-3,4-dihydro-2,4-dioxo-2H-1,3-benzo-
  thiazin-3-yl;
1,4-dihydro-1-methyl-2,4-dioxo-3(2H)quinoazolinyl;
1,2-benzisothiazolin-2-yl, 1,1-dioxide;
5-benzyl-1-oxo-2-isoindolinyl;
2-isothiazolidinyl, 1,1-dioxide;
2-oxo-1-pyrrolidinyl;
3,4-dihydro-3-oxo-2H-1,2-benzothiazin-2-yl, 1,1-dioxide;
7-carbomethoxy-3,4-dihydro-1,3-dioxo-2(1H)-isoquin-
  olyl; and
o-benzenedisulfonimido.

EXAMPLE XV

Saccharimide of 1-aminocyclohexane penicillin

6 - (1 - aminocyclohexanecarboxamido) - 3,3 - di-methyl - 7 - oxo - 4 - thia - 1 - azabicyclo[3.2.0]heptane-2-carboxylic acid, also known as 1-aminocyclohexane penicillin, (23.4 g., 0.0685 mole) is added to one liter of methylene chloride followed by triethylamine (6.93 g., 0.0685 mole) giving a solution. The magnetically stirred solution is cooled to 3° C. in ice-water. 3-chloro-1,2-benzisothiazole 1,1-dioxide (13.8 g., 0.0685 mole) is added all at once, and the resulting solution is reacted and worked up in a manner similar to Example I, giving crude 2 - [6 - (1 - aminocyclohexanecarboxamido) - 3,3-dimethyl - 7 - oxo - 4 - thia - 1 - azabicyclo[3.2.0]hept-2 - yl carbonyl) - 1,2 - benzisothiazol-3(2H) - one 1,1-dioxide, also described as the saccharimide of 1-amino-cyclohexane penicillin, as a light yellow solid (16.5 g., 48%), M.P. 174° dec. (uncorr.).

Analysis.—Calcd. for $C_{22}H_{26}N_4O_6S_2$ (percent): C, 52.16; H, 5.17; N, 11.06; S, 12.66. Found (percent): C, 51.06; H, 5.06, 4.90; N, 10.82; S, 11.28.

In a similar manner, reacting appropriate 1-aminocyclo-alkane penicillins with 3-chloro-1,2-benzisothiazole 1,1-dioxide, the following compounds are prepared:

1-aminocycloheptane penicillin saccharimide;
1-aminocyclooctane penicillin saccharimide; and
1-aminocyclononane penicillin saccharimide.

EXAMPLE XVI

Saccharimide of dicloxacillin

6 - [3 - (2,6 - dichlorophenyl) - 5 - methylisoazol - 4-carboxamido] - 3,3 - dimethyl - 7 - oxo - 4 - thia - 1-azabicyclo[3.2.0]heptane-2-carboxylic acid, also known as dicloxacillin, (47.03 g., 0.1 mole) is added to anhydrous methylene chloride (1.5 liter) followed by triethylamine (10.1 g., 0.1 mole), giving a solution. The magnetically stirred solution is cooled to 3° C. in ice-water, and 3-chloro-1,2-benzisothiazole 1,1-dioxide (20.2 g., 0.1 mole) is added all at once. The resulting solution is reacted and worked up in a manner similar to Example I, giving a crude light yellow foam. The foam is crystallized from ethyl acetate giving white crystals of 2 - [(6 - (2,6-dichlorophenyl) - 5 - methylisoxazol - 4 - carboxamido]-3,3 - dimethyl - 7 - oxo - 4 - thia - 1 - azabicyclo[3.2.0] hept - 2 - yl) carbonyl] - 1,2 - benzisothiazol - 3(2H)-one 1,1-dioxide, also described as the saccharimide of di-cloxacillin, (10 g., 16%), M.P. 192° C. dec. (uncorr.).

Analysis.—Calcd. for $C_{26}H_{20}Cl_2N_4O_7S_2$ (percent): C, 49.12; H, 3.17; N, 8.81; S, 10.09; Cl, 11.16. Found (percent): C, 49.15; H, 3.30; N, 8.72; S, 9.83; Cl, 11.15.

EXAMPLE XVII

Saccharimide of benzyl penicillin

Triethylammonium 3,3 - dimethyl - 7 - oxo - 6 - (2-phenylacetamido) - 4 - thia - 1 - azabicyclo[3.2.0]heptane-2-carboxylate, also known as benzyl penicillin, (105 g., 0.222 mole) is dissolved in methylene chloride (2.5 liter) and the solution is cooled to 3° C. in ice-water. Then 3-chlorо-1,2-benzisothiazole 1,1-dioxide (44.8 g., 0.222 mole) is added to the mangetically stirred solution all at once. The resulting solution is reacted and worked up in a manner similar to Example I, giving white crystals of 2 - [(3,3 - dimethyl - 7 - oxo - 6 - (2 - phenylacetamido)- 4 - thia - 1 - azabicyclo[3.2.0]hept - 2 - yl) carbonyl]-1,2 - benzisothiazol - 3(2H) - one 1,1-dioxide, also known as the saccharimide of benzyl penicillin, 70 g., 63%), M.P. 198° C. dec. (uncorr.), that are washed with cold methylene chloride and anhydrous ether. The filtrate of the crystals yields an additional amount of crude yellow solid (19.5 g.).

Analysis.—Calcd. for $C_{23}H_{21}N_3O_6S_2$ (percent): C, 55.30; H, 4.23; N, 8.41; S, 12.84. Found (percent): C, 55.21; H, 4.12; N, 8.41; S, 12.65.

EXAMPLE XVIII

Saccharimide of phenoxymethyl penicillin

2 - 6 - amino - 3,3 - dimethyl - 7 - oxo - 4 - thia - 1-azabicyclo[3.2.0]hept - 2 - yl carbonyl) - 1,2 - benziso-thiazol - 3(2H) - one 1,1-dioxide, p-toluenesulfonic acid salt, also known as the saccharimide of 6-aminopenicil-lanic acid p-toluenesulfonic acid salt, (2.21 g., 0.004 mole) is added to a mixture of ethanol (15 ml.), methyl-ene chloride (15 ml.), water (8 ml.) and sodium bicar-bonate (1.01 g., 0.012 mole) stirred at 0–3° C. Then phenoxyacetyl chloride (1.36 g., 0.008 mole) in methyl-ene chloride (3 ml.) is added over a few minutes, fol-lowed by more sodium bicarbonate (1.01 g., 0.012 mole), and the mixture is stirred at 0–3° C. for one hour. Water (25 ml.) is added and the mixture is extracted twice with methylene chloride. Then the methylene chloride solu-tion is washed twice with water, once with saturated salt, and dried over sodium sulfate. The solution is then evapo-rated under vacuum at 20° C. to a small volume, and anhydrous ether (approx. 25 ml.) is added, giving a white solid which is 2 - [(3,3 - dimethyl - 7 - oxo - 6 - [2 - phe-noxyacetamido] - 4 - thia - 1 - azabicyclo[3.2.0]hept - 2-yl) carbonyl] - 1,2 - benzisothiazol - 3(2H) - one 1,1-dioxide (0.75 g., 35%) which has an infrared spectrum which is identical to the compound of Example I.

When the above procedure is repeated using appropri-ate reactants the following compounds are prepared:

2,6-dipropoxybenzyl penicillin saccharimide;
4-butoxynaphthyl penicillin saccharimide;
naphthyl penicillin saccharimide;
3-(2,6-dibromophenyl)-4-isoxazoyl penicillin
  saccharimide;
3-(2-fluoro-4-iodophenyl)-5-propyl-4-isoxazoyl
  penicillin saccharimide;
5-ethyl-3-(p-fluorophenyl)-4-isoxazoyl penicillin
  saccharimide;
1-amino-4-chloro-1,2,3,4-tetrahydronaphthyl penicillin
  saccharimide;
1-amino-4-bromo-5-methoxy-1,2,3,4-tetrahydronaphthyl
  penicillin saccharimide;
6-(2,2-dibutyl-5-oxo-4-phenylimidazolidin-1-yl)
  penicillanic acid saccharimide;
6-(2-ethyl-5-oxo-4-phenylimidazolidin-1-yl)penicillanic
  acid saccharimide;
6-[5-oxo-4-phenyl-2-(4-piperidine)imidazolidin-1-yl]
  penicillanic acid saccharimide;
6-(2-cyclobutyl-5-oxo-4-phenylimidazolidin-1-yl)-
  penicillanic acid saccharimide; and
6-(2-cyclohexyl-5-oxo-4-phenylimidazolidin-1-yl)-
  penicillanic acid saccharimide.

EXAMPLE XIX

When the procedure of Example XVIII is repeated to react 2 - [(7 - amino - 3 - hydroxymethyl-8-oxo-5-thia-1-azabicyclo[4.2.0]oct - en - 2 - yl)carbonyl]-1,2-benziso-thiazol-3(2H)-one 1,1-dioxide acetate with an appropriate acyl chloride, the compounds listed in Table K are prepared:

Table K

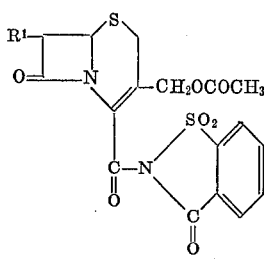

wherein $R^1$ is defined as follows:

2-phenoxyacetamido;
2,2-dimethyl-5-oxo-4-phenylimidazolidin-1-yl;
thiophene-2-acetamido;
2-ethoxy-1-naphthamido;
2-amino-2-phenylacetamido;
1-aminocyclohexanecarboxamido;
2-phenylacetamido;
1-aminocyclopentanecarboxamido;
1-naphthamido; and
3-(2,6-dichlorophenyl)-5-methyl-4-isoxazolecarboxamido.

EXAMPLE XX

Phenoxymethyl penicillin

2-[(3,3-dimethyl - 7 - oxo-6-[2-phenoxyacetamido]-4-thia - 1 - azabicyclo[3.2.0]hept-2-yl)carbonyl]-1,2-benzisothiazol-3(2H)-one 1,1-dioxide, also known as the saccharimide of phenoxymethyl penicillin (5.16 g., 0.01 mole) is dissolved in tetrahydrofuran (30 ml.), and then a solution of sodium bicarbonate (1.68 g., 0.02 mole) in water (20 ml.) is added. The mixture is magnetically stirred at room temperature for two and a half hours under nitrogen and water (15 ml.) is added. Some of the tetrahydrofuran is removed at 30° C. under vacuum until a cloudy solution is obtained. The solution is stirred an additional half hour, and then all of the tetrahydrofuran is removed at 30° C. under vacuum. The mixture is washed twice with methylene chloride and all of the methylene chloride is removed at 30° C. under vacuum. Then glacial acetic acid (2.4 ml.) is added, and the mixture is stirred in ice for twenty minutes and a brown gum is filtered off and washed with water (15 ml.) After sitting at room temperature for about two hours, white crystals formed in the mother liquor (1.2 g., 34%). The infrared spectrum is identical to one for 3,3-dimethyl-7-oxo-6-(2-phenoxyacetamido) - 4 - thia-1-azabicyclo[3.2.0]heptane-2-carboxylic acid.

When the above procedure is conducted substituting as starting materials the saccharimides of Examples I–XVIII, the corresponding 3-acetoxymethyl-8-oxo-5-thia-7-substituted - 1 - azabicyclo[4.2.0]oct-2-en-2-carboxylic acids and 3,3-dimethyl-7-oxo-6-substituted-4-thia-1-azabicyclo[3.2.0]heptane-2-carboxylic acids are afforded.

EXAMPLE XXI 1-aminocyclohexane penicillin

2-[(6-amino - 3,3 - dimethyl-7-oxo-4-thia-1-azabicyclo[3.2.0]hept - 2 - yl)carbonyl] - 1,2 - benzisothiazol-2H)-one 1,1-dioxide, hydrochloride (80 g., 0.1725 mole on the basis of 98% purity) is added to a solution of acetonitrile (1200 ml.) and water (300 ml.) that had previously been warmed to 35° C. The mixture is rapidly stirred for approximately thirty seconds, causing the solid to dissolve. The solution is stirred and cooled in an ice-salt bath, and at 11° C. the pH is adjusted to 2.5–3.0 with 35% sodium hydroxide. 1-amino-cyclohexanecarboxylic acid chloride, hydrochloride (43.6 g., 0.22 mole) is added in approximately ten portions over a period of about fifteen minutes. The temperature is maintained at 8–10° C. and, simultaneously, with the addition of the acid chloride, there is added 35% sodium hydroxide to maintain the pH at 2.5 to 3. After adding all the acid chloride the mixture is stirred at pH 2.75 at 0–10° C. for twenty minutes and the pH adjusted to 2.0 with concentrated hydrochloric acid. The stirring is stopped and the top layer is removed by decantation. Anhydrous ether (2.4 liters) is added to the top layer and the mixture cooled to 5° C. in ice-salt and stirred for one hour. The solid is filtered and the organic solvents are removed by evaporation. The resulting solid is powdered, stirred with cold water (140 ml.), filtered and washed once with cold water. The pasty filter cake is spread on filter paper, air-dried until solid, powdered and dried over $P_2O_5$ vacuum, giving a white powder which is 2 - [(6-[1-aminocyclohexanecarboxamido]-3,3-dimethyl - 7 - oxo-4-thia-1-azabicyclo[3.2.0]hept - 2 - yl) carbonyl]-1,2-benzisothiazol-3(2H)-one 1,1 - dioxide, hydrochloride, also described as the saccharimide of 1-aminocyclohexane penicillin hydrochloride (21 g., 22%).

Cold water (130 ml.) is added to the lower layer and the solid is filtered using a funnel. The filter cake is washed twice with cold water, and the pasty filter cake is spread on filter paper and dried. The solid is powdered and dried over $P_2O_5$ vacuum, giving a white powder which is also the saccharimide of 1-aminocyclohexane penicillin hydrochloride (50 g., 52%).

The above-prepared saccharimide of 1 - aminocyclohexane penicillin hydrochloride (4.0 g., 7.13 mole) is mixed with water (20 ml.) until completely suspended. Quinoline (4 ml.) is dripped in over approximately three minutes, giving a thick white paste. Mixing is continued for one hour causing most of the solid to dissolve, but leaving a gum on the sides of the flask that is scrapped into the solution. The mixture is filtered and washed with water (5 ml.). The filtrate is cooled to 0° C. and the pH brought to 7.6 with 25% NaOH. The mixture is washed twice with ether, and antipyrine (1.2 g., 6.4 mole) is added. The solution is cooled to —3 to —5° C. and the pH adjusted to 1.5 while crystals form. After ten minutes the mixture is filtered and the filtrate washed with ethyl acetate. The pH of the aqueous phase is raised to 5.2 with 25% sodium hydroxide, and the solution concentrated at 30° C. to 7.5 ml. The solution is seeded with a few crystals of 1-aminocyclohexane penicillin dihydrate and a few crystals of anhydrous 1-aminocyclohexane penicillin. Isopropanol (about one milliliter) is added, and after scratching crystals form. The crystals are kept at 0° C. overnight, filtered, and washed with a minimum of cold water, giving white crystals of 6 - (1-aminocyclohexanecarboxamido)-3,3-dimethyl-7-oxo - 4 - thia-1-azabicyclo[3.2.0.]heptane-2-carboxylic acid, dihydrate (1.37 g., 51%).

What is claimed is:
1. A compound selected from the group having the formula:

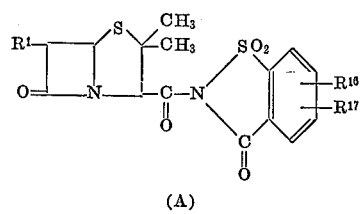

(A)

wherein $R^1$ is selected from the group consisting of those having the formulae:

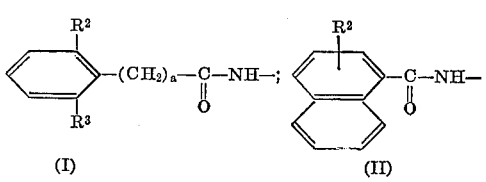

(I)            (II)

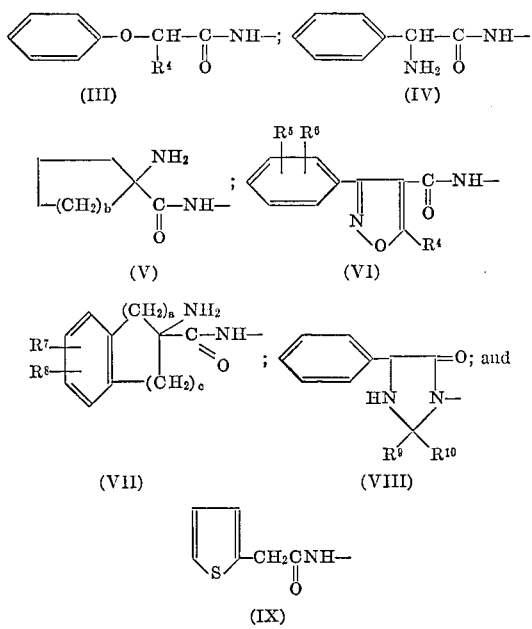

(III) (IV) (V) (VI) (VII) (VIII) (IX)

wherein $R^2$ and $R^3$ are selected from the group consisting of hydrogen and lower alkoxy; $R^4$ is selected from the group consisting of hydrogen, lower alkyl and phenyl; $R^5$ and $R^6$ are selected from the group consisting of hydrogen and halogen; $R^7$ and $R^8$ are selected from the group consisting of hydrogen, halogen, lower alkyl, lower alkoxy, phenyl and phenoxy; $R^9$ and $R^{10}$ when taken separately are selected from the group consisting of hydrogen and lower alkyl, and when taken together with carbon atom to which they are attached complete a ring selected from the group consisting of cycloalkyl containing from about 4 to about 8 carbon atoms, and piperidine; $R^{16}$ and $R^{17}$ when taken separately are selected from the group consisting of hydrogen, lower alkyl, lower alkoxy, halogen, phenyl, phen(lower)alkyl; lower alkoxyphenyl, 2-pyridyl, 4-pyridyl, trifluoromethyl, di(lower)alkylamino, nitro, sulfamido, carb(lower)alkoxy, cyano, lower alkylthio, lower alkylsulfonyl, and when $R^{16}$ and $R^{17}$ are joined they complete a benzene ring fused to the existing benzene ring of the saccharyl moiety to form a naphthalene ring; $a$ is an integer from 0 to 1; $b$ is an integer from 0 to 5; $c$ is an integer from 1 to 3, with the provisos that when $a$ is 0, $c$ is greater than 1, and when $a$ is 1, $c$ is less than 3; and pharmacologically acceptable, acid-addition salts of those compounds of Formula A wherein $R^1$ is selected from the groups (IV), (V) and (VII).

2. A compound as described in claim 1, wherein $R^1$ is of the Formula III and $R^4$, $R^{16}$ and $R^{17}$ are each hydrogen, which compound is: the saccharimide of phenoxypenicillin.

3. A compound as described in claim 1, wherein $R^1$ is of the Formula VIII, and $R^9$ and $R^{10}$ are each methyl, $R^{16}$ and $R^{17}$ are each hydrogen, which compound is: the saccharimide of 6-(2,2-dimethyl-5-oxo-4-phenylimidazolidin-1-yl)penicillanic acid.

4. A compound as described in claim 1, wherein $R^1$ is of the Formula V, $R^{16}$ and $R^{17}$ are each hydrogen, and $b$ is 2, which compound is: the saccharimide of 1-aminocyclohexane penicillin.

5. A compound as described in claim 1, wherein $R^1$ is of the Formula VI, $R^{16}$ and $R^{17}$ are each hydrogen, $R^4$ is methyl, and each of $R^5$ and $R^6$ are chloro, which compound is: the saccharimide of dicloxacillin.

6. A compound as described in claim 1, wherein $R^1$ is of the Formula I, and $R^2$, $R^3$, $R^{16}$ and $R^{17}$ are each hydrogen, and $a$ is 1, which compound is: the saccharimide of benzyl penicillin.

7. A compound as described in claim 1, wherein $R^1$ is of the Formula IV and $R^{16}$ and $R^{17}$ are both hydrogen, which compound is: the saccharimide of ampicillin.

8. A compound selected from the group having the formula:

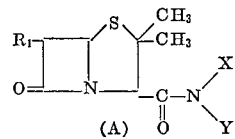

(A)

wherein $R_1$ is selected from the group consisting of those having the formulae:

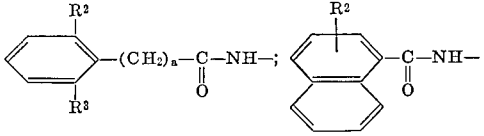

(I) (II)

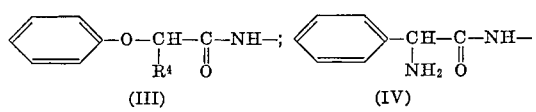

(III) (IV)

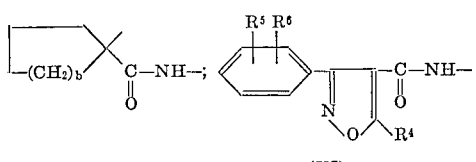

(V) (VI)

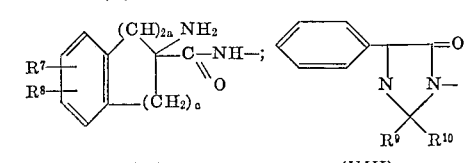

(VII) (VIII)

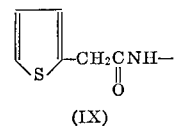

(IX)

wherein $R^2$ and $R^3$ are selected from the group consisting of hydrogen and lower alkoxy; $R^4$ is selected from the group consisting of hydrogen, lower alkyl and phenyl; $R^5$ and $R^6$ are selected from the group consisting of hydrogen and halogen; $R^7$ and $R^8$ are selected from the group consisting of hydrogen, halogen, lower alkyl, lower alkoxy, phenyl and phenoxy; $R^9$ and $R^{10}$ when taken separately are selected from the group consisting of hydrogen and lower alkyl, and when taken together with the carbon atom to which they are attached complete a ring selected from the group consisting of cycloalkyl containing from about 4 to about 8 carbon atoms and piperidine; $a$ is an integer from 0 to 1; $b$ is an integer from 0 to 5; $c$ is an integer from 1 to 3, with the provisos that when $a$ is 0, $c$ is greater than 1, and when $a$ is 1, $c$ is less than 3; when not taken together X and Y are selected from the group consisting of cyano, nitro, trifluoromethylsulfonyl, 2,4,6-trimethylbenzoyl, 2,3,5,6-tetramethylbenzoyl, carb(lower)alkoxy, di(lower)alkylcarbamyl, (lower)alkylsulfonyl, di(lower)alkylsulfamyl, di(lower)alkylamino(lower)alkylsulfonyl, (lower)alkanoyl, cyclo(lower)alkanoyl, naphthylsulfonyl, pyridyl-sulfonyl, furylsulfonyl

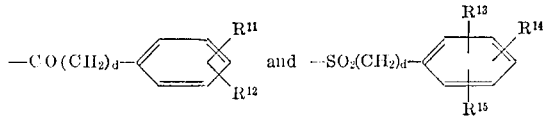

wherein R¹¹ and R¹² are selected from the group consisting of hydrogen, (lower)alkyl, halogen, trifluoromethyl, (lower)alkoxy, phenyl, phenoxy, nitro, (lower)alkylsulfonyl, di(lower)alkyl sulfamyl; R¹³, R¹⁴ and R¹⁵ are selected from the group consisting of hydrogen, nitro, halogen, trifluoromethyl, (lower)alkyl, (lower)alkoxy, (lower)alkylsulfonyl, (lower)alkylthio, di(lower)alkylsulfamyl, di(lower)alkylcarbamyl, cyano and carb(lower)alkoxy; and the integer $d$ is from 0 to about 6; and X and Y when taken together with the nitrogen atom are selected from the group consisting of

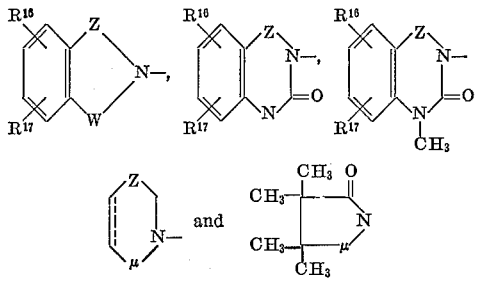

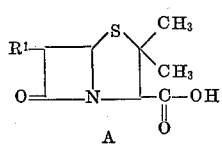

wherein R¹⁶ and R¹⁷ when taken separately are selected from the group consisting of hydrogen, (lower)alkyl, (lower)alkoxy, halogen phenyl, phen(lower)alkyl, (lower)alkoxyphenyl, 2-pyridyl, 4-pyridyl, trifluoromethyl, nitro, di(lower)alkylamino, sulfamido, carb(lower)alkoxy, cyano, (lower)alkylthio, (lower)alkylsulfonyl; and when R¹⁶ and R¹⁷ are joined, they complete a benzene ring to form therewith a naphthalene ring; Z is selected from the group consisting of sulfonyl and carbonyl; W is selected from the group consisting of sulfonyl, carbonyl and methylene; V is selected from the group consisting of oxygen, sulfur and methylene; $\mu$ is selected from the group consisting of carbonyl and methylene; and the broken line indicates the presence of a single or double bond between these two positions; and the pharmacologically acceptable acid addition salts of those compounds of Formula A wherein R¹ is selected from the groups (IV), (V) and (VII).

9. A method of preparing compounds having the formulae:

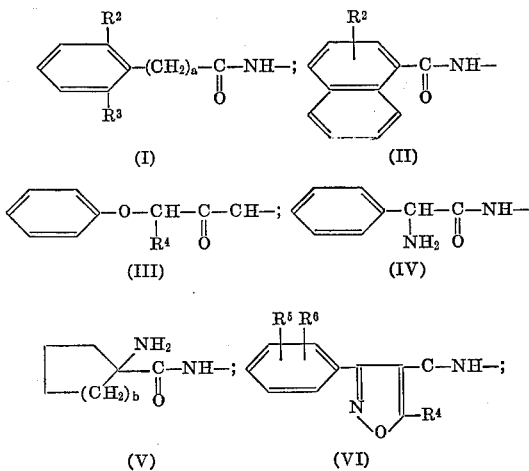

wherein R¹ is selected from the group consisting of:

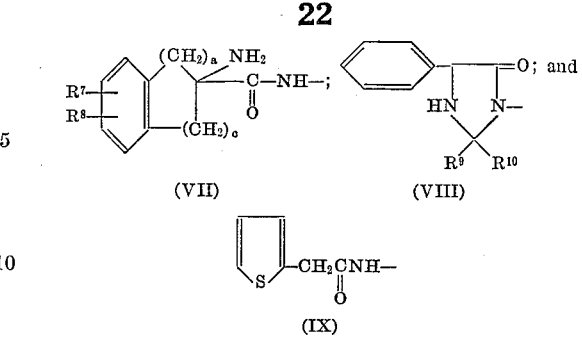

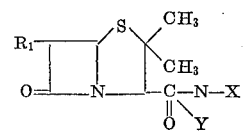

wherein R² and R³ are selected from the group consisting of hydrogen and lower alkoxy; R⁴ is selected from the group consisting of hydrogen, lower alkyl and phenyl; R⁵ and R⁶ are selected from the group consisting of hydrogen and halogen; R⁷ and R⁸ are selected from the group consisting of hydrogen, halogen, lower alkyl, lower alkoxy, phenyl and phenoxy; R⁹ and R¹⁰ when taken separately are selected from the group consisting of hydrogen and lower alkyl, and when taken together with the carbon atom to which they are attached completely a ring selected from the group consisting of cycloalkyl containing from about 4 to about 8 carbon atoms and piperidine; $a$ is an integer from 0 to 1; $b$ is an integer from 0 to 5; $c$ is an integer from 1 to 3, with the provisos that when $a$ is 0, $c$ is greater than 1, and when $a$ is 1, $c$ is less than 3, which comprises: contacting a compound selected from the group having the formulae:

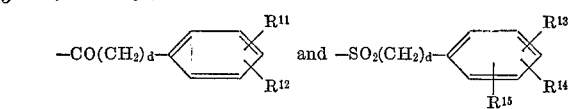

wherein R¹ has the same meaning as set forth above; and wherein X and Y when not taken together are selected from the group consisting of cyano, nitro, trifluoromethylsulfonyl, 2,4,6 - trimethylbenzoyl, 2,3,5,6 - tetramethylbenzoyl, carb(lower)alkoxy, di(lower)alkylcarbamyl, (lower)alkylsulfonyl, di(lower)alkylsulfamyl, di(lower)alkylamino(lower)alkylsulfonyl, (lower)alkanoyl, cyclo(lower)alkanoyl, naphthylsulfonyl, pyridylsulfonyl, furylsulfonyl, $$-CO(CH_2)_d-\underset{R^{12}}{\overset{R^{11}}{\text{⌬}}} \text{ and } -SO_2(CH_2)_d-\underset{R^{14}}{\overset{R^{13}}{\underset{R^{15}}{\text{⌬}}}}$$

wherein R¹¹ and R¹² are selected from the group consisting of hydrogen, (lower)alkyl, halogen, trifluoromethyl, (lower)alkoxy, phenyl, phenoxy, nitro, (lower)alkylsulfonyl, di(lower)alkylsulfamyl; R¹³, R¹⁴ and R¹⁵ are selected from the group consisting of hydrogen, nitro, halogen, trifluoromethyl, (lower)alkyl, (lower)alkoxy, (lower)alkylsulfonyl, (lower)alkylthio, di(lower)alkylsulfamyl, di(lower)alkylcarbamyl, cyano, and carb(lower)alkoxy; and the integer $d$ is from 0 to about 6; and X and Y when taken together with the nitrogen atom are selected from the group consisting of

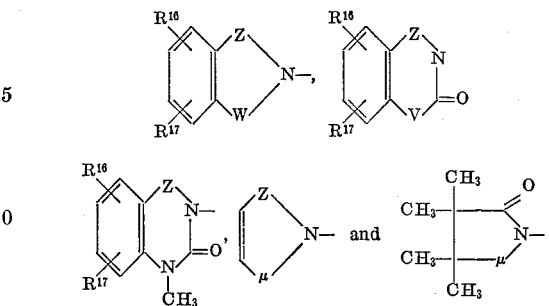

wherein R¹⁶ and R¹⁷ when taken separately are selected from the group consisting of hydrogen, (lower)alkyl, (lower)alkoxy, halogen, phenyl, phen(lower)alkyl, (lower)alkoxyphenyl, 2-pyridyl, 4-pyridyl, trifluoromethyl, nitro, di(lower)alkylamino, sulfamido, carb(lower)alkoxy, cyano, (lower)alkylthio, (lower)alkylsulfonyl; and when $R^{16}$ and $R^{17}$ are joined, they complete a benzene ring to form therewith a naphthalene ring; Z is selected from the group consisting of sulfonyl, carbonyl; W is selected from the group consisting of sulfonyl, carbonyl and methylene; V is selected from the group consisting of oxygen sulfur and methylene; m$\mu$ is selected from the group consisting of carbonyl and methylene; and the broken line indicates the presence of a single or double bond between these two positions; and the pharmacologically acceptable acid addition salts of those compounds of Formula A wherein $R^1$ is selected from the groups (IV), (V) and (VII); with water.

10. A method as described in claim 9 wherein X and Y are taken together to form a saccharimido group of the formula

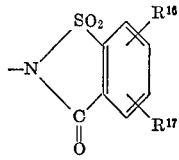

wherein $R^{16}$ and $R^{17}$ when taken separately are selected from the group consisting of hydrogen, (lower)alkyl, (lower)alkoxy, halogen, phenyl, phen(lower)alkyl, (lower)alkoxyphenyl, 2-pyridyl, 4-pyridyl, trifluoromethyl, nitro, di(lower)alkylamino, sulfamido, carb(lower)alkoxy, cyano, (lower)alkylthio, (lower)alkylsulfonyl and when $R^{16}$ and $R^{17}$ are joined they complete a benzene ring fused to the existing benzene ring to form a naphthalene ring.

11. A method as described in claim 9 wherein X and Y are taken together to form the group

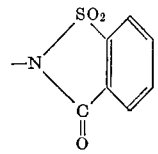

12. A method as described in claim 9 wherein the pH of the water is adjusted from about 1.5 to about 9.

References Cited
UNITED STATES PATENTS 3,829,926  11/1966  Brain et al. _____ 260—239.1

NICHOLAS S. RIZZO, Primary Examiner

U.S. Cl. X.R.

424—246, 271; 260—243 C